No. 737,717. Patented September 1, 1903.

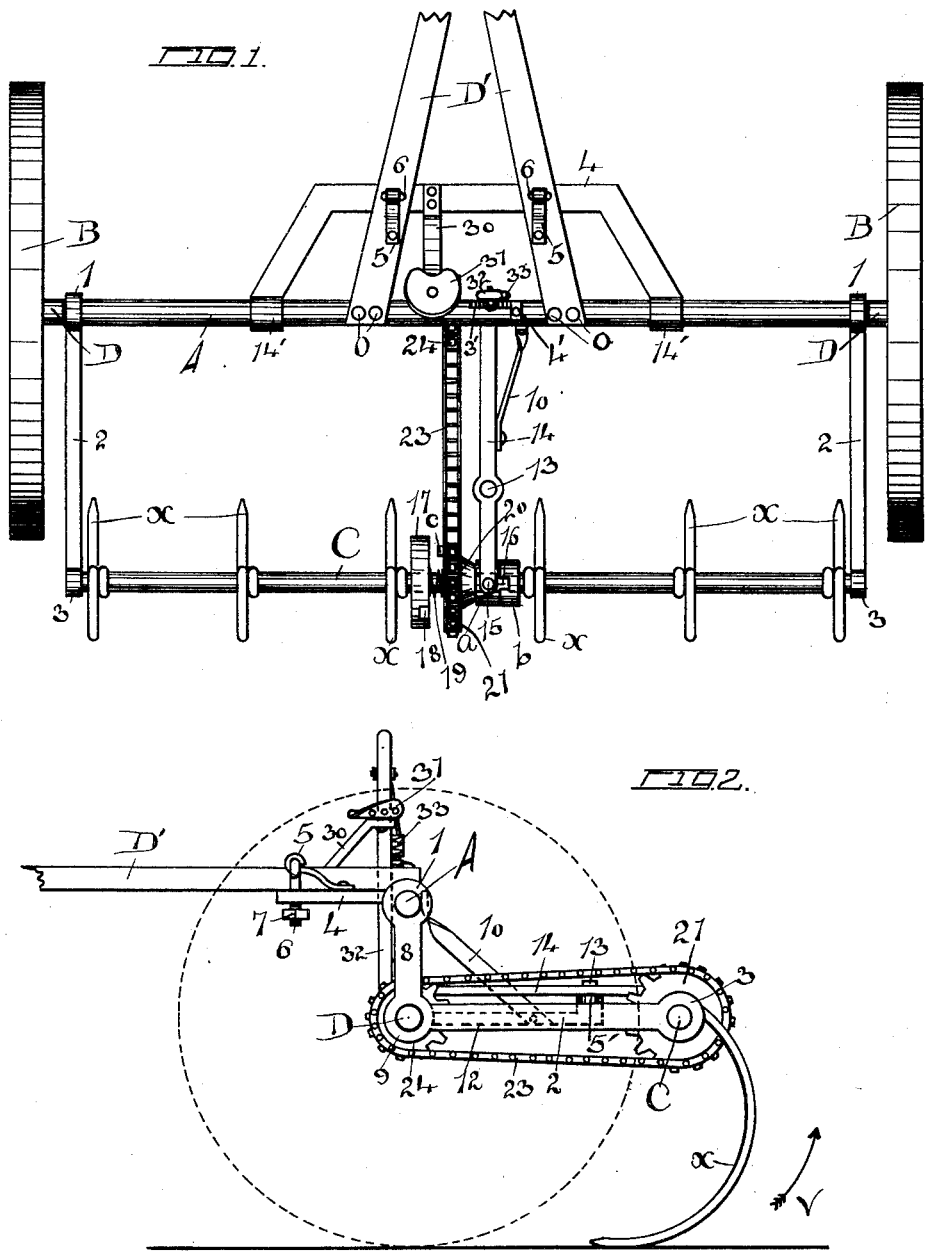

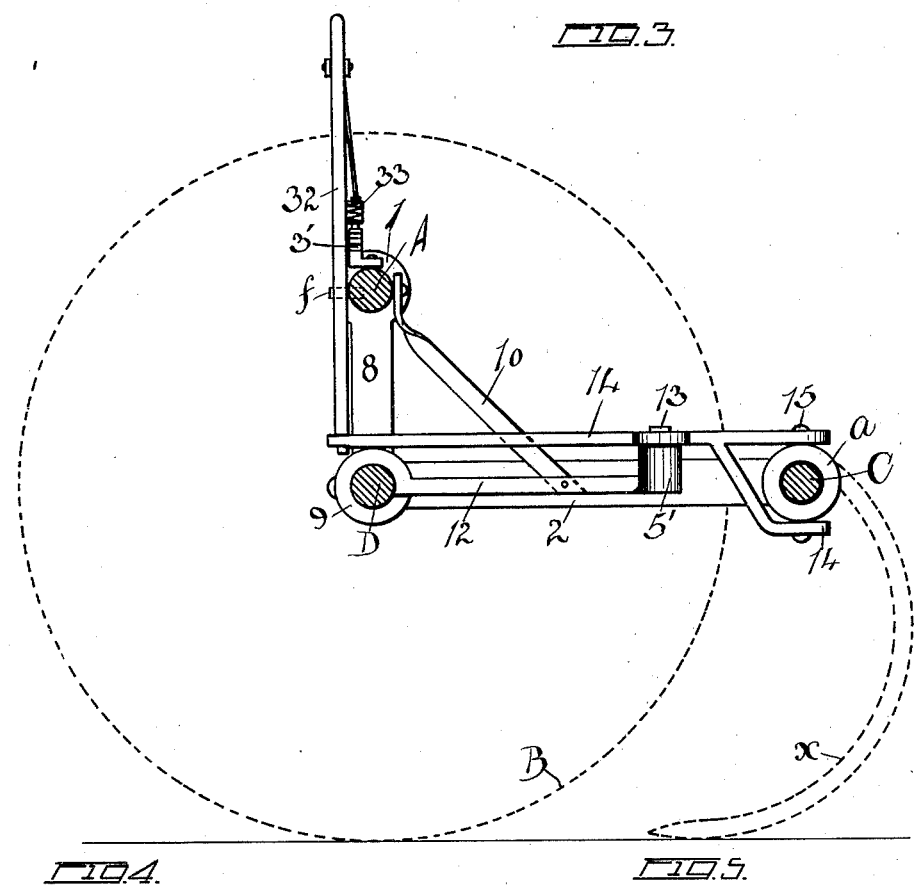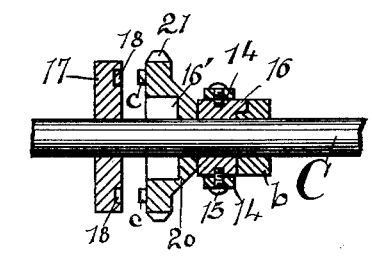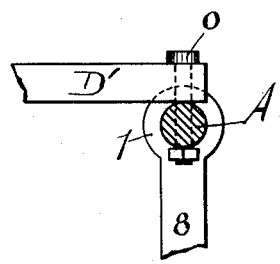

UNITED STATES PATENT OFFICE.

WILLIAM A. DODD, OF DECATUR, NEBRASKA.

HAY-RAKE.

SPECIFICATION forming part of Letters Patent No. 737,717, dated September 1, 1903.

Application filed September 18, 1902. Serial No. 123,905. (No model.)

*To all whom it may concern:*

Be it known that I, WILLIAM A. DODD, residing at Decatur, in the county of Burt and State of Nebraska, have invented certain useful Improvements in Hay-Rakes; and I do hereby declare that the following is a full, clear, and exact description of the invention, such as will enable others skilled in the art to which it appertains to make and use the same, reference being had to the accompanying drawings, which form a part of this specification.

This invention relates to a new and useful improvement in hay-rakes.

The aim of my invention is to provide a hay-rake so arranged that the hay may be readily gathered and be instantly deposited or released from the rake, as will be described more fully hereinafter; and my invention embodies certain novel combinations, as will be described more fully hereinafter and finally pointed out in the claim.

In the accompanying drawings I have shown in Figure 1 a top view of a rake embodying my invention with portions removed. Fig. 2 shows a side elevation with portions removed. Fig. 3 shows a side elevation disclosing the arrangement of the lever and sliding collar. Fig. 4 shows a sectional view of the chain-sprocket and sliding collar. Fig. 5 discloses a broken view of the tongue D'.

In carrying out the aim of my invention I construct a hay-rake comprising a main axle D, which has secured to it two supporting-wheels B.

Extending upward from the supporting-axle D are the L-shaped supporting-brackets, as shown, comprising the vertical portion 8, having the bearing 1 above and the bearing 9 below, and the horizontal portion 2, provided with the bearing 3 at its end, as is clearly shown in Fig. 2. Held within the bearings 3 is a tooth-shaft C, provided with a plurality of rake-teeth $x$, as shown. This tooth-shaft C is further provided with the disk 17, having a recess 18, and the collar $b$, having a suitable seating 16, as is shown in Figs. 1 and 4. Loosely working upon this tooth-shaft C, between the disk 17 and the collar $b$, as shown in Fig. 4, is the chain-sprocket 21, provided with the hub 20 and the pin $c$, adapted to seat within the seating 18. Positioned between the disk 17 and the gear-wheel 21 is the coil-spring 19, held within the socket 16 and shown in Fig. 4, while positioned between the hub 20 and the collar $b$ is the sliding collar $a$, provided with the nosing 16, adapted to normally find a seating within the collar $b$. This sliding collar $a$ is secured by means of a pin 15 to the shifting bar 14, pivoted by means of the pin 13 to the bracket 12, (shown in Fig. 3 and in dotted outline in Fig. 2,) which bracket is provided with the hub 5' to receive the pin 13. In order to support this bracket 12, I provide the connecting-bar 10, which is above secured to the main axle A, as disclosed in Figs. 1 and 2. In front this pivoted shifting bar 14 is secured to a shifting lever 32, pivotally secured by means of a pin $f$ to the brace-bar A and provided with a thumb-latch 33, as is usual in the art, so that this lever 32 may be locked at suitable points to the notched sector 3', as disclosed in Fig. 3. Now in throwing the lever 32 from side to side the pivoted shifting bar 14 is actuated to carry the sliding collar $a$ out of engagement with the collar $b$ to force the chain-sprocket 21 into engagement with the disk 17.

The supporting-axle D is provided with a chain-sprocket 24, having a chain 23 working over the chain-sprocket 21, so that the rotary movement of the axle D is imparted to the gear-wheel 21.

Secured within the upper bearings 1 is a transverse brace-bar A, which has movably secured to it by means of the bolts O the bars D', forming a tongue, to which the draft-animals are secured, as shown in Fig. 5. Extending from these tongue members D' are the bolts 6, which have secured to them the bow-springs 5, which springs in turn are secured to the projecting supporting-bracket 4, which bracket is provided with the bearings 14', which encompass the brace-bar A. These bolts 6 are below provided with the nut 7 and are so arranged that the brace-bar A is permitted a rocking movement, the projecting supporting-bracket 4 working against the nut 7 and this nut being connected to the bolt 6, held by the spring 5. This is done so that in case ruts or stones are encountered the shock will be partly compensated, in that the hay-rake proper is movably secured to the tongue members D'.

Extending upward from the projecting supporting-bracket 4 is a seat-brace 30, provided above with the seat 31.

When the parts have been properly constructed and connected, the operation of my device is as follows: In carrying a rake over the field the main supporting-axle D is permitted a swinging movement by virtue of the upper brace-bar A being loosely connected to the tongue members D' and, further, by means of the spring 5, as has been set forth. As the rake is advanced the axle D rotates to revolve the chain-sprocket 24 and the connected chain-sprocket 21, operated by means of the chain 23. This chain-sprocket 21 normally rotates about the tooth-shaft C. This tooth-shaft C is prevented from rotating by means of the sliding collar $a$, held by means of the shifting bar 14, so that normally this tooth-shaft C is immovably held. In carrying the rake across the field the hay is gathered within the rake, and when a sufficient amount has been collected the operator draws the lever 32 toward himself, which results in the sliding collar $a$ leaving the collar $b$, so that the nosing $c$ of the chain-sprocket 21 engages the disk 17 to rotate this tooth-shaft C, so that the rake-teeth are carried in a complete circle revolving backward in the path of the arrow $v$, so that the load is quickly and positively deposited. As soon as the rake-teeth have been liberated of the load the lever 32 is again shifted, so that the nosing 16 engages the collar $b$ to stop the tooth-shaft C, the spring 19 promptly forcing the chain-sprocket 21 out of engagement with the disk 17.

Having thus described my said invention, what I claim as new, and desire to secure by United States Letters Patent, is—

The combination with a wheel-supported axle, of an approximately L-shaped supporting-bracket secured to said axle near each end, a chain-sprocket secured to said supporting-axle, a brace-bar within the upper end of said L-shaped supporting-bracket, a shifting lever secured to said brace-bar, a tongue loosely secured to said brace-bar, a bracket projecting from said brace-bar, a bolt passing through said tongue and through said last-mentioned bracket, a spring to support said bolt secured to said projecting bracket, a horizontally-disposed supporting-bar extending from aforesaid supporting-axle, a pivotally-held shifting bar secured to said horizontally-disposed supporting-bar and to said shifting lever, a tooth-shaft within the lower end of said L-shaped brackets, a notched collar fixed to said tooth-shaft, a sliding collar provided with a nose secured to said shifting bar and working upon said tooth-shaft, said nose being adapted to come in contact with aforesaid notched collar, a disk provided with a seat secured to said tooth-shaft, a chain-sprocket loosely working upon said tooth-shaft provided with a nose adapted to engage the seating within aforesaid disk, a chain connecting aforementioned chain-sprockets, a spring interposed between said disk and the chain-sprocket secured to said shaft, all arranged substantially as and for the purpose set forth.

In testimony whereof I affix my signature in presence of two witnesses.

WILLIAM A. DODD.

Witnesses:
GEORGE W. SUES,
ANNA TRACY.